Feb. 10, 1925.

L. A. SKIFSTROM

POTHOLE RING FOR COOK STOVES

Filed Dec. 15, 1921

INVENTOR
LEWIS A. SKIFSTROM
BY
Attorneys

Patented Feb. 10, 1925.

1,526,097

UNITED STATES PATENT OFFICE.

LEWIS A. SKIFSTROM, OF COKATO, MINNESOTA.

POTHOLE RING FOR COOKSTOVES.

Application filed December 15, 1921. Serial No. 522,589.

*To all whom it may concern:*

Be it known that I, LEWIS A. SKIFSTROM, a citizen of the United States, resident of Cokato, county of Wright, State of Minnesota, have invented certain new and useful Improvements in Pothole Rings for Cookstoves, of which the following is a specification.

The object of my invention is to provide a ring for the pot-hole of a cook-stove to enable the cook or user to lower the kettle or other cooking utensil to a point much nearer the fire than would be possible if the utensil were set upon the top of the stove or in the usual pot-hole provided therein, the device being particularly serviceable in cooking when the fire is low.

A further object is to provide a pot-hole ring that is capable of being reversed for the purpose of raising the kettle or other utensil a considerable distance above the top of the stove, as when it is desired to only keep the contents of the kettle warm or for cooking slowly.

A further object is to provide a pot-hole ring capable of rotary adjustment with the opening therein arranged to be moved by said rotary adjustment nearer to or farther away from the wall or breast of the stove fire-box.

The invention consists generally in various constructions and combinations, all as hereinafter described and particularly pointed out in the claim.

Figure 1:
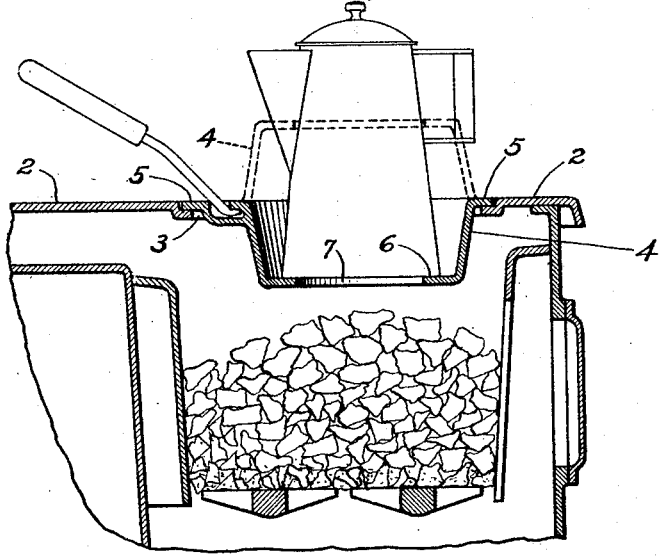
Figure 2:
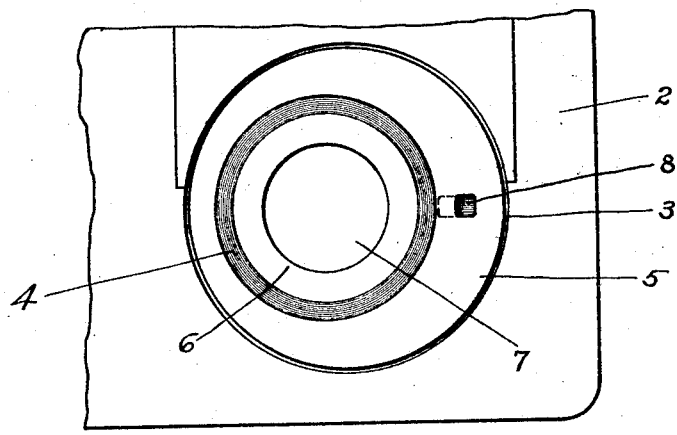
Figure 3:
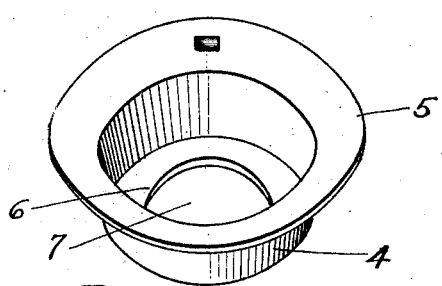

In the accompanying drawings forming part of this specification,

Figure 1 is a sectional view of a portion of a stove with my invention applied thereto, Figure 2 is a plan view of the same, Figure 3 is a perspective view, showing the pot-hole ring removed from the stove.

In the drawing, 2 represents an ordinary cook-stove, having the usual pot-hole 3, and 4 is a ring fitting within the pot-hole and having an annular flange 5 at its upper edge projecting outwardly and adapted to rest upon the edge of the pot-hole and support the ring depending therein. The ring is preferably imperforate and depends a considerable distance within the fire-box of the stove and at its lower edge is provided with an inwardly projecting annular flange 6 which lies in a plane parallel substantially with the flange 5 and has an opening 7 therein through which access may be had to the fire-box and over which the kettle or other cooking utensil is placed, resting upon the flange 6. I prefer to arrange this opening 7 eccentrically with respect to the flange 5 so that when the ring is rotated in the pot-hole, the opening 7 will be moved toward or away from the wall or breast of the fire-box and thus the articles being cooked are subjected to a greater or less degree of heat, as desired.

The depending ring 4 allows the utensil to be suspended close to the fire on the grate and with this arrangement I am able to cook with a much less volume of fire than would be required if the cooking utensil was supported in the pot-hole in the usual way.

In Figure 1 I have indicated by dotted lines how the ring may be reversed in the pot-hole so that the utensil will be supported a considerable distance above the top of the stove and the fire and articles already cooked may be kept warm in this position or, in case there is a large fire in the firebox, the utensil may be supported on the reversed ring and cooking carried on while in this position.

The ring and supporting flange are imperforate and fit snugly within the pot-hole and have, therefore, no ventilating or draft functions, being designed entirely for the purpose of bringing the cooking utensil nearer to or farther away from the fire.

A socket 8 is provided in the flange 5 to receive the ordinary lid or cover lifter.

I claim as my invention:

A cook stove attachment comprising a ring adapted to fit into a pot hole in the top of the stove and depend therein to a point near the body of fuel, the upper edge of said ring having an annular flange thereon projecting radially and adapted to rest in the seat of the pot hole cover in the top of the stove, said flange having a socket to receive a lifter and being wider on one side of said ring than on the other whereby rotation of said ring in the stove will change its position with respect to the fuel body, the lower edge of said ring having an inwardly projecting annular flange encircling a comparatively large central opening, said inwardly projecting flange forming a seat and support for a cooking utensil close to the flame, the base of said utensil being exposed through said comparatively large opening to the heat of the fuel body said ring being adapted to be inverted to form a support for the utensil raised a considerable distance above the fuel body.

In witness whereof, I have hereunto set my hand this 12th day of December, 1921.

LEWIS A. SKIFSTROM.